(12) United States Patent
Mears et al.

(10) Patent No.: US 11,916,858 B1
(45) Date of Patent: Feb. 27, 2024

(54) METHOD AND SYSTEM FOR OUTBOUND SPAM MITIGATION

(71) Applicant: Sophos Limited, Abingdon (GB)

(72) Inventors: John Mears, Oxfordshire (GB); Brett Hunter Cove, British Columbia (CA)

(73) Assignee: Sophos Limited, Abingdon (GB)

( * ) Notice: Subject to any disclaimer, the term of this patent is extended or adjusted under 35 U.S.C. 154(b) by 0 days.

(21) Appl. No.: 17/958,046

(22) Filed: Sep. 30, 2022

(51) Int. Cl.
*H04L 51/214* (2022.01)
*H04L 51/212* (2022.01)
*H04L 61/5061* (2022.01)
*H04L 9/40* (2022.01)
*H04L 51/224* (2022.01)

(52) U.S. Cl.
CPC .......... *H04L 51/214* (2022.05); *H04L 51/212* (2022.05); *H04L 51/224* (2022.05); *H04L 61/5061* (2022.05); *H04L 63/10* (2013.01); *H04L 2463/082* (2013.01)

(58) Field of Classification Search
CPC . H04L 51/212; H04L 51/224; H04L 61/5061; H04L 63/10
See application file for complete search history.

(56) References Cited

U.S. PATENT DOCUMENTS

| | | | | |
|---|---|---|---|---|
| 8,560,616 B1 * | 10/2013 | Diac | ...................... | H04L 51/212 709/229 |
| 8,959,157 B2 * | 2/2015 | Walter | .................. | H04L 51/212 709/206 |
| 9,117,074 B2 * | 8/2015 | Srivastava | ............ | G06F 21/552 |
| 11,381,537 B1 * | 7/2022 | Freed | .................. | H04L 47/6225 |
| 11,411,990 B2 * | 8/2022 | Pandey | ............... | H04L 63/1466 |
| 2008/0082658 A1 * | 4/2008 | Hsu | ........................ | H04L 51/212 709/224 |
| 2010/0332601 A1 * | 12/2010 | Walter | .................. | H04L 51/212 709/206 |
| 2014/0280902 A1 * | 9/2014 | Szamonek | .......... | H04L 61/5007 709/224 |
| 2014/0310811 A1 * | 10/2014 | Hentunen | ........... | H04L 63/1441 726/23 |
| 2016/0164866 A1 * | 6/2016 | Oberheide | .......... | H04L 63/0853 726/1 |
| 2018/0082062 A1 * | 3/2018 | Hager | ................. | H04L 63/1416 |

(Continued)

*Primary Examiner* — David R Lazaro
(74) *Attorney, Agent, or Firm* — Schmeiser, Olsen & Watts LLP

(57) ABSTRACT

A method for mitigating outbound electronic message spam includes determining whether an outbound electronic message to a recipient sent from an electronic messaging account of a sender has at least a predetermined number of indicators of compromise. The outbound electronic message is sent to the recipient using an IP address from a first pool of service delivery IP addresses based on a determination that the message has less than the predetermined number of indicators of compromise. The outbound electronic message is sent to the recipient using an IP address from a second pool of service delivery IP addresses based on a determination that the message has at least the predetermined number of indicators of compromise. The method may further include providing a notification of a possible compromise of the electronic messaging account and the notification may include a request to modify a security feature of the electronic messaging account.

14 Claims, 6 Drawing Sheets

(56) References Cited

U.S. PATENT DOCUMENTS

| | | | |
|---|---|---|---|
| 2018/0295146 A1* | 10/2018 | Kovega | H04L 63/1416 |
| 2020/0213334 A1* | 7/2020 | Kutner | H04L 63/101 |
| 2021/0266294 A1* | 8/2021 | Chechik | H04L 51/222 |
| 2022/0021700 A1* | 1/2022 | Devlin | H04L 63/1441 |
| 2022/0247810 A1* | 8/2022 | Bennett | H04L 51/48 |
| 2022/0286432 A1* | 9/2022 | Chechik | H04L 51/222 |
| 2022/0400094 A1* | 12/2022 | Sampath | H04L 51/214 |
| 2023/0195863 A1* | 6/2023 | Xu | H04L 63/107 726/22 |

* cited by examiner

METHOD AND SYSTEM FOR OUTBOUND SPAM MITIGATION

TECHNICAL FIELD

The present disclosure relates generally to the special-purpose processing of electronic mail. More specifically, this application describes methods and systems for the determination of a potential outbound spam event and implementing automatic responsive action.

BACKGROUND

Electronic mail, generally referred to as email, is a well-known form of communication between users of personal computers, smart devices, and other electronic devices. The convenience of email has enabled messages and other forms of information to be sent quickly to designated recipients. Spam email is unsolicited and typically unwanted email generally sent in bulk to a large number of recipients. Due to a generally insignificant cost per email, businesses may employ spam email in mass quantities to reach large numbers of potential customers. In other instances, spam email may be used to attempt to gain access to personal computers and other user devices, for example, by including links that can infect with malware.

Spammers often use tools to facilitate the sending of spam emails. These tools attempt to gain access to email accounts through a variety of techniques, including determining a password to access an account. Once successfully accessed, the email account may be used by the spammer to send a high volume of email. These outbound emails may be sent using a set of Internet Protocol (IP) addresses that are shared among a large number of users. Outbound spam emails can result in a poor reputation for the associated IP addresses. Consequently, other email systems may blacklist these IP addresses and reject future emails from these IP addresses. As a result, the compromised email account and other email accounts sending emails using the blacklisted IP addresses may fail to have their legitimate outbound emails reach the intended recipients.

The present disclosure addresses the above-identified problems associated with outbound spam emails.

SUMMARY

According to embodiments disclosed herein, a method, and associated computer system and computer program product for mitigating outbound electronic message spam are provided. According to the method, one or more processors of a computer system determine whether an outbound electronic message to a recipient sent from an electronic messaging account of a sender has at least a predetermined number of indicators of compromise. The outbound electronic message is sent by the one or more processors to the recipient using an IP address from a first pool of service delivery IP addresses based on a determination that the outbound electronic message has less than the predetermined number of indicators of compromise. Alternatively, the outbound electronic message is sent by the one or more processors to the recipient using an IP address from a second pool of service delivery IP addresses based on a determination that the outbound electronic message has at least the predetermined number of indicators of compromise.

BRIEF DESCRIPTION OF THE DRAWINGS

The above and further advantages of the disclosed concepts and features may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the disclosed concepts and features.

DETAILED DESCRIPTION

Figure 1:
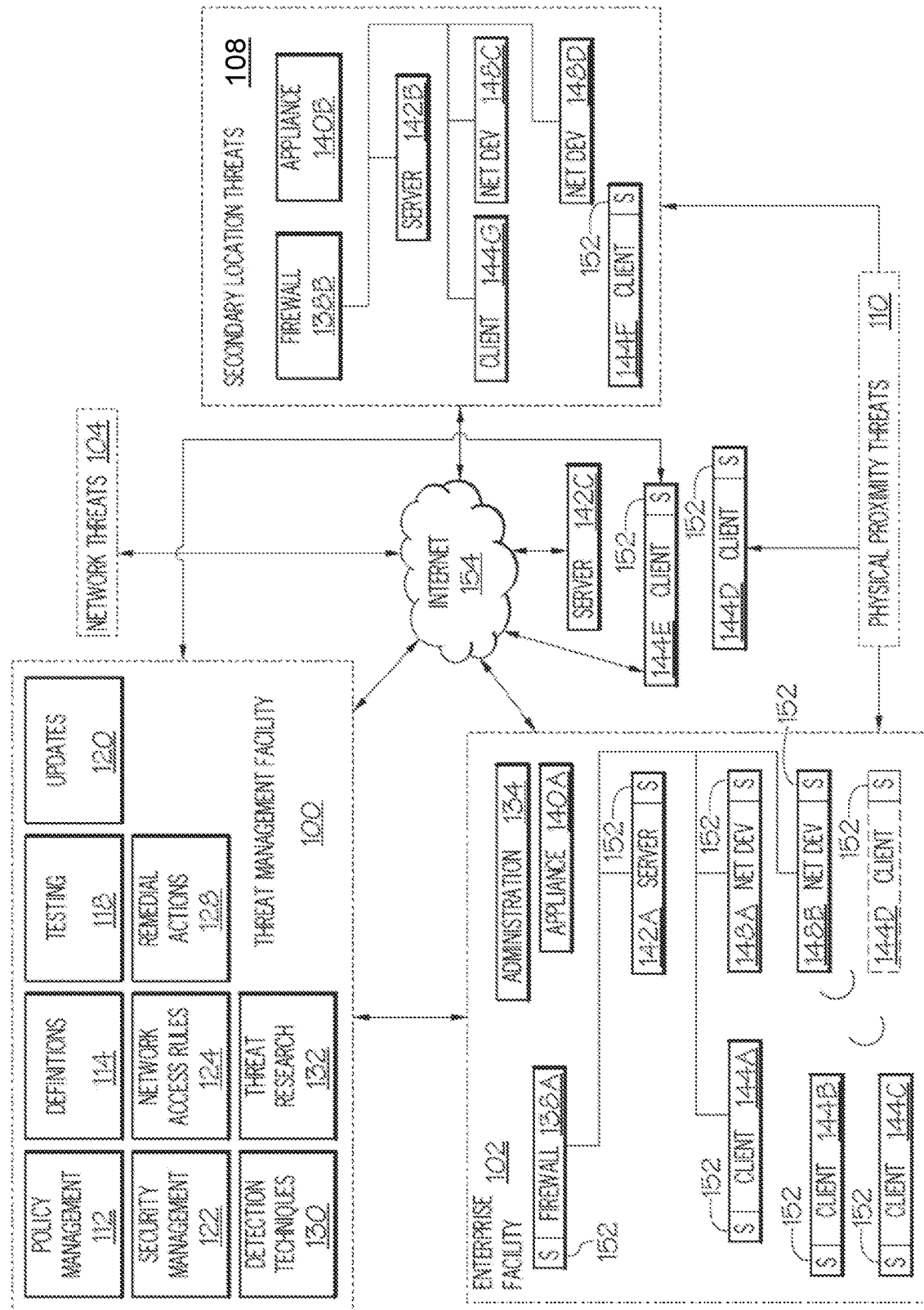
FIG. 1 is a block diagram of an environment for threat management according to an example embodiment.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location unless a different meaning is explicitly provided or otherwise clear from the context.

As used herein, an "electronic message" means a message, that may contain text, files, images, and/or other attachments sent through a network to a specified recipient or a group of recipients. The following description is directed primarily to email messages; however, the described methods and systems generally apply to any electronic message that utilizes an IP address. An "outbound electronic message" means messages sent by a user to one or more recipients outside the set of associated domains for the user. For example, the user may be an employee, officer or agent of an organization utilizing the associated domains.

The term "indicator of compromise" (IoC) is used herein as meaning an observable activity or feature that may suggest an electronic messaging account, such as an email account, has been compromised. By way of example, a compromised account may be an account belonging to an authorized user that has been accessed by an unauthorized user. A spam message, as used herein, means an email or other electronic message that is an inbound message from a spammer or an outbound message generated by a spammer that is sent from a compromised account. There may be one or more indicators of compromise associated with a spam message.

Embodiments herein are directed to mitigation of outbound electronic message spam. Embodiments include a determination of whether an outbound electronic message to a recipient sent from an electronic messaging account of a user has at least a predetermined number of IoCs. If the number of IoCs is less than the predetermined number, the outbound electronic message to the recipient is sent from a first pool of service delivery IP addresses. Conversely, if the number of IoCs equals or exceeds the predetermined number, the outbound electronic message to the recipient is sent from a second pool of service delivery IP addresses.

The first pool of IP addresses may contain the regular delivery IP addresses for a group of electronic messaging accounts and the second pool of delivery addresses may contain IP addresses that are reserved for emails that may be sent from electronic messaging accounts that are suspected or known to be compromised accounts.

In one scenario, a spammer uses a tool to assist in sending spam emails. The tool attempts to log in to multiple email accounts using one or more techniques. When a successful log in occurs, the tool may attempt to send an email from the compromised account to the spammer so that the spammer knows that the email account is accessible for initiating outbound spam emails. This email sent to the spammer from the compromised email account is sometimes referred to as a phone home precursor email. Although it may be possible to prevent the precursor email from being sent back to the spammer, it is often preferable to take no action on the precursor email. For example, if the precursor email were to be blocked, the spammer may easily recognize that the improper access to the email account was detected. In response, the spammer may change the mode of operation for attempting to access email accounts.

Using embodiments of the method in conjunction with the described scenario, subsequent emails sent from the compromised account are not sent using a normal service delivery IP address from a first pool of IP addresses. Instead, one or more service delivery IP address from a second pool of IP addresses are used. The IP addresses in the second pool are reserved for "risky" outbound emails, that is, emails that may include such outbound spam emails. Thus, the chance that IP addresses in the second pool may acquire a bad reputation, and consequently be blocked or blacklisted, does not impact outbound emails from uncompromised email accounts which utilize the IP addresses in the first pool.

FIG. 1 is a block diagram of a threat management system providing protection to an enterprise against a plurality of threats. One aspect relates to corporate policy management and implementation through a unified threat management facility 100. As will be explained in more detail below, a threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g., employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services, and policy management may be offered as one of the services. A description of certain capabilities and components of the threat management system 100 is now provided.

Over recent years, malware has become a major problem across the Internet 154. From both a technical perspective and a user perspective, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at one or more laptops, desktops, servers, gateways, communication ports, handheld or mobile devices, firewalls, and the like. Similarly, there may be less benefit to the user in having different solutions for known and unknown threats. As such, a consolidated threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have led to a rapid increase in the speed at which threats may move. Today, an unprotected PC connected to the Internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection and provide them to enterprise facility 102 network administrators to better control their environments. In addition to stopping malicious code, the threat management facility 100 may provide policy management that may be able to control legitimate applications, such as voice over Internet Protocol (VoIP), instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility 100 providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations, and may include administration 134, a firewall 138A, an appliance 140A, server 142A, network devices 148A-B, clients 144A-D, such as protected by computer security facilities 152, and the like. It will be understood that any reference herein to client facilities may include the clients 144A-D shown in FIG. 1 and vice-versa. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include clients 144D (or client facilities) that have moved into network connectivity not directly associated or controlled by the enterprise facility 102. Threats to client facilities may come from a plurality of sources, such as from network threats 104, physical proximity threats 110, secondary location threats 108, and the like. Clients 144A-D may be protected from threats even when the client 144A-D is not located in association with the enterprise 102, such as when a client 144E-F moves in and out of the enterprise facility 102, for example when interfacing with an unprotected server 142C through the Internet 154, when a client 144F is moving into a secondary location threat 108 such as interfacing with components 140B, 142B, 148C, 148D that are not protected, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility computing resource. The security management facility 122 may have the ability to scan the client facility files for malicious code, remove or quarantine certain applications and files, prevent certain actions, perform remedial actions and perform other security measures. In embodiments, scanning the client facility may include scanning some or all of the files stored to the client facility on a periodic basis, scanning an application when the application is executed, scanning files as the files are transmitted to or from the client facility, or the like. The scanning of the applications and files may be performed to detect known malicious code or known unwanted applications. In an embodiment, new malicious code and unwanted applications may be continually developed and distributed, and updates to the known code database may be provided on a periodic basis, on a demand basis, on an alert basis, or the like.

In an embodiment, the security management facility 122 may provide for email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide Internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

In an embodiment, the security management facility 122 may provide for host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running. Whereas runtime protection may only interrupt code that has already partly executed, behavioral protection can identify malicious code at the gateway or on the file servers and delete the code before it can reach endpoint computers and the like.

In an embodiment, the security management facility 122 may provide for reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

In an embodiment, the security management facility 122 may provide for the overall security of the enterprise facility 102 network or set of enterprise facility 102 networks, may provide updates of malicious code information to the enterprise facility 102 network, and associated client facilities. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or the like. The security management facility 122 may include the management of receiving malicious code descriptions from a provider, distribution of malicious code descriptions to enterprise facility 102 networks, distribution of malicious code descriptions to client facilities, or the like.

The threat management facility 100 may provide a policy management facility 112 that may be able to block non-malicious applications, such as VoIP, instant messaging, peer-to-peer file-sharing, and the like, that may undermine productivity and network performance within the enterprise facility 102. The policy management facility 112 may be a set of rules or policies that may indicate enterprise facility 102 access permissions for the client facility, such as access permissions associated with the network, applications, external computer devices, and the like. The policy management facility 112 may include a database, a text file, a combination of databases and text files, or the like. In an embodiment, a policy database may be a block list, a blacklist, an allowed list, a whitelist, or the like that may provide a list of enterprise facility 102 external network locations/applications that may or may not be accessed by the client facility. The policy management facility 112 may include rules that may be interpreted with respect to an enterprise facility 102 network access request to determine if the request should be allowed. The rules may provide a generic rule for the type of access that may be granted. The rules may be related to the policies of an enterprise facility 102 for access rights for the enterprise facility's 102 client facility. For example, there may be a rule that does not permit access to sporting websites. When a website is requested by the client facility, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM activity to only support personnel for communicating with customers. This may allow communication for departments requiring access but may maintain the network bandwidth for other activities by restricting the use of IM to only the personnel that need access to instant messaging (IM) in support of the enterprise facility 102. In an embodiment, the policy management facility 112 may be a stand-alone application, may be part of the network server facility 142, may be part of the enterprise facility 102 network, may be part of the client facility, or the like.

In embodiments, the threat management facility 100 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

In embodiments, the threat management facility 100 may also provide for the removal of applications that may interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a sometimes quickly evolving malware environment may require timely updates, and thus an update management facility 120 may be provided by the threat management facility 100. In addition, a policy management facility 112 may also require update management (e.g., as provided by the update facility 120 herein described). The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or client facility, the enterprise facility 102 network and/or client facility may pull information from the security facility 122 and policy management facility 112 network server facilities 142, there may be a combination of pushing and pulling of information between the security facility 122 and the policy management facility 112 network servers 142, enterprise facility 102 network, and client facilities, or the like. For example, the enterprise facility 102 network and/or client facility may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility by providing notification that there are updates available for download and then transmitting the information. The combination of the security management 122 network server facility 142 and security update module may function substantially the same as the policy management facility 112 network server and policy update module by providing information to the enterprise facility 102 network and the client facility in a push or pull method. In an embodiment, the policy management facility 112 and the security facility 122 management update modules may work in concert to provide information to the enterprise facility's 102 network and/or client facility for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility for the determination of malicious code that may be within the file or application. The definition files may contain a number of commands, definitions, or instructions, to be parsed and acted upon, or the like. In embodiments, the client facility may be updated with new definition files periodically to provide the client facility with the most recent malicious code definitions; the updating may be performed on a set time period, may be updated on demand from the client facility, may be updated on demand from the network, may be updated on a received malicious code alert, or the like. In an embodiment, the client facility may request an update to the definition files from an update facility 120 within the network, may request updated definition files from a computing facility external to the network, updated definition files may be provided to the client facility 114 from within the network, definition files may be provided to the client facility from an external computing facility from an external network, or the like.

In an embodiment, a definition management facility 114 may provide for the timely updates of definition files information to the network, client facilities, and the like. New and altered malicious code and malicious applications may be continually created and distributed to networks worldwide. The definition files that maintain the definitions of the malicious code and malicious application information for the protection of the networks and client facilities may need continual updating to provide continual defense of the network and client facility from the malicious code and malicious applications. The definition files management may provide for automatic and manual methods of updating the definition files. In embodiments, the network may receive definition files and distribute the definition files to the network client facilities, the client facilities may receive the definition files directly, or the network and client facilities may both receive the definition files, or the like. In an embodiment, the definition files may be updated on a fixed periodic basis, on demand by the network and/or the client facility, as a result of an alert of a new malicious code or malicious application, or the like. In an embodiment, the definition files may be released as a supplemental file to an existing definition file to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received updates from the administration facility 134, from a rules provider, or the like.

The threat management facility 100 may provide for a way to control access to the enterprise facility 102 networks. For instance, the enterprise facility 102 may want to restrict access to certain applications, networks, files, printers, servers, databases, or the like. In addition, the enterprise facility 102 may want to restrict user access under certain conditions, such as the user's location, usage history, need to know, job position, connection type, time of day, method of authentication, client-system configuration, or the like. Network access rules may be developed by the enterprise facility 102, or pre-packaged by a supplier, and managed by the threat management facility 100 in conjunction with the administration facility 134. Network access rules and control may be responsible for determining if a client facility application should be granted access to a requested network location. The network location may be on the same network as the facility or may be on another network. In an embodiment, the network access control may verify access rights for client facilities from within the network or may verify access rights of computer facilities from external networks. When network access for a client facility is denied, the network access control may send an information file to the client facility, the information file may contain data or commands that may provide instructions for the remedial action facility 128. The information sent by the network access facility 124 control may be a data file. The data file may contain a number of commands, definitions, instructions, or the like to be parsed and acted upon through the remedial action facility 128, or the like. The information sent by the network access facility 124 control may be a command or command file that the remedial action facility 128 may access and take action upon.

In an embodiment, the network access rules 124 may provide an information store to be accessed by the network access control. The network access rules facility 124 may include databases such as a block list, a blacklist, an allowed list, a whitelist, an unacceptable network site database, an acceptable network site database, a network site reputation database, or the like of network access locations that may or may not be accessed by the client facility. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites, controlling instant messenger accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may be able to retrieve predefined rule sets from a provider that may provide a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may provide for a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility, quarantine of the application, terminating the application, isolation of the application, isolation of the client facility to a location within the network that restricts network access, blocking a network access port from a client facility, reporting the application to an administration facility 134, or the like.

Remedial action may be provided as a result of a detection of a threat or violation. The detection techniques facility 130 may include monitoring the enterprise facility 102 network or endpoint devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility, and the like. This may provide the capability of not allowing a streaming file or portions of the streaming file containing malicious code from entering the client facility, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility computing facilities on a network. The administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities by the reported information. Remedial action may be taken for any of the client facility computing facilities as determined by the administration facility 134; remedial action may be taken by the administration facility 134 or by the user of the client facility.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility, server facility 142, administration facility 134, firewall 138, gateway, hubs and routers 148, threat management appliance 140, desktop users, mobile users, and the like. In embodiments, it may be the endpoint computer security facility 152, located on a computer's desktop, which may provide threat protection to a user, and associated enterprise facility 102. In embodiments, the term endpoint may refer to a computer system that may source data, receive data, evaluate data, buffer data, or the like (such as a user's desktop computer as an endpoint computer), a firewall as a data evaluation endpoint computer system, a laptop as a mobile endpoint computer, a PDA or tablet as a hand-held endpoint computer, a mobile phone as an endpoint computer, or the like. In embodiments, endpoint may refer to a source or destination for data, including such components where the destination is characterized by an evaluation point for data, and where the data may be sent to a subsequent destination after evaluation. The endpoint computer security facility 152 may be an application loaded onto the computer platform or computer support component, where the application may accommodate the plurality of computer platforms and/or functional requirements of the component. For instance, a client facility computer may be one of a plurality of computer platforms, such as Windows, Macintosh, Linux, and the like, where the endpoint computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility computing platforms on which the endpoint computer security facility 152 is adapted. A client facility computing platform may be a computer system that is able to access a service on another computer, such as a server facility 142, via a network. This client facility server facility 142 model may apply to a plurality of networked applications, such as a client facility connecting to an enterprise facility 102 application server facility 142, a web browser client facility connecting to a web server facility 142, an e-mail client facility retrieving e-mail from an Internet 154 service provider's mail storage servers 142, and the like. In embodiments, traditional large client facility applications may be switched to websites, which may increase the browser's role as a client facility. Clients 144 may be classified as a function of the extent to which they perform their own processing. For instance, client facilities are sometimes classified as a fat client facility or thin client facility. The fat client facility, also known as a thick client facility or rich client facility, may be a client facility that performs the bulk of data processing operations itself, and does not necessarily rely on the server facility 142. The fat client facility may be most common in the form of a personal computer, where the personal computer may operate independent of any server facility 142. Programming environments for fat clients 144 may include CURT, Delphi, Droplets, Java, win32, X11, and the like. Thin clients 144 may offer minimal processing capabilities, for instance, the thin client facility may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility may also be a mix of the two, such as processing data locally, but relying on a server facility 142 for data storage. As a result, this hybrid client facility may provide benefits from both the fat client facility type, such as multimedia support and high performance, and the thin client facility type, such as high manageability and flexibility. In embodiments, the threat management facility 100, and associated endpoint computer security facility 152, may provide seamless threat protection to the plurality of clients 144, and client facility types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility connections in order to service requests from clients 144. The server facility 142 application may run on the same computer as the client facility using it, or the server facility 142 and the client facility may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100 and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal, also referred to as a web-based user portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102 but may require protection from threats via an endpoint computer security facility 152. These appliances may provide interconnection services within the enterprise facility 102 network, and therefore may advance the spread of a threat if not properly protected.

One way for a client facility to be protected from threats from within the enterprise facility 102 network may be a personal firewall. A personal firewall may be an application that controls network traffic to and from a client, permitting or denying communications based on a security policy. Personal firewalls may be designed for use by end-users, which may result in protection for only the computer on which it is installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an endpoint computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network." Since firewall facilities 138 represent boundaries between threat levels, the endpoint computer security facility 152 associated with the firewall facility 138 may provide resources that may control the flow of threats at this enterprise facility 102 network entry point. Firewall facilities 138, and associated endpoint computer security facility 152, may also be associated with a network node that may be equipped for interfacing between networks that use different protocols. In embodiments, the endpoint computer security facility 152 may provide threat protection in a plurality of network infrastructure locations, such as at the enterprise facility 102 network entry point, i.e., the firewall facility 138 or gateway; at the server facility 142; at distribution points within the network, i.e., the hubs and routers 148; at the desktop of client facility computers; and the like. In embodiments, the most effective location for threat detection may be at the user's computer desktop endpoint computer security facility 152.

The interface between the threat management facility 100 and the enterprise facility 102, and through the appliance facility 140 to embedded endpoint computer security facilities, may include a set of tools that may be the same for all enterprise implementations, but allow each enterprise to implement different controls. In embodiments, these controls may include both automatic actions and managed actions. Automatic actions may include downloads of the endpoint computer security facility 152 to components of the enterprise facility 102, downloads of updates to existing endpoint computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM and VoIP; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities within the enterprise facility 102 may be connected to the enterprise facility 102 network by way of wired network facilities 148A or wireless network facilities 148B. Client facilities connected to the enterprise facility 102 network via a wired facility 148A or wireless facility 148B may receive similar protection, as both connection types are ultimately connected to the same enterprise facility 102 network, with the same endpoint computer security facility 152, and the same threat protected enterprise facility 102. Mobile wireless facility clients 144B-F, because of their ability to connect to any wireless 148B,D network access point, may connect to the Internet 154 outside the enterprise facility 102, and therefore outside the threat-protected environment of the enterprise facility 102. In this instance the mobile client facility (e.g., the clients 144B-F), if not for the presence of the endpoint computer security facility 152 may experience a malware attack or perform actions counter to enterprise facility 102 established policies. In addition, there may be a plurality of ways for the threat management facility 100 to protect the out-of-enterprise facility 102 mobile client facility (e.g., the clients 144D-F) that has an embedded endpoint computer security facility 152, such as by providing URI filtering in personal routers, using a web appliance as a DNS proxy, or the like. Mobile client facilities that are components of the enterprise facility 102 but temporarily outside connectivity with the enterprise facility 102 network may be provided with the same threat protection and policy control as client facilities inside the enterprise facility 102. In addition, mobile the client facilities may receive the same interactions to and from the threat management facility 100 as client facilities inside the enterprise facility 102, where the mobile client facilities may be considered a virtual extension of the enterprise facility 102, receiving all the same services via their embedded endpoint computer security facility 152.

Interactions between the threat management facility 100 and the components of the enterprise facility 102, including mobile client facility extensions of the enterprise facility 102, may ultimately be connected through the Internet 154. Threat management facility 100 downloads and upgrades to the enterprise facility 102 may be passed from the firewalled networks of the threat management facility 100 through to the endpoint computer security facility 152 equipped components of the enterprise facility 102. In turn the endpoint computer security facility 152 components of the enterprise facility 102 may upload policy and access requests back across the Internet 154 and through to the threat management facility 100. The Internet 154 however, is also the path through which threats may be transmitted from their source. These network threats 104 may include threats from a plurality of sources, including without limitation, websites, e-mail, IM, VoIP, application software, and the like. These threats may attempt to attack a mobile enterprise client facility (e.g., the clients 144B-F) equipped with an endpoint computer security facility 152, but in embodiments, as long as the mobile client facility is embedded with an endpoint computer security facility 152, as described above, threats may have no better success than if the mobile client facility were inside the enterprise facility 102.

However, if the mobile client facility were to attempt to connect into an unprotected connection point, such as at a secondary location 108 that is not a part of the enterprise facility 102, the mobile client facility may be required to request network interactions through the threat management facility 100, where contacting the threat management facility 100 may be performed prior to any other network action. In embodiments, the client facility's 144 endpoint computer security facility 152 may manage actions in unprotected network environments such as when the client facility (e.g., client 144F) is in a secondary location 108 or connecting wirelessly to a non-enterprise facility 102 wireless Internet connection, where the endpoint computer security facility 152 may dictate what actions are allowed, blocked, modified, or the like. For instance, if the client facility's 144 endpoint computer security facility 152 is unable to establish a secured connection to the threat management facility 100, the endpoint computer security facility 152 may inform the user of such and recommend that the connection not be made. In the instance when the user chooses to connect despite the recommendation, the endpoint computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the endpoint computer security facility 152 may perform specific actions to remediate possible threat incursions or policy violations during or after the unprotected connection.

The secondary location 108 may have no endpoint computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities. The connection may be made from direct connection with the enterprise facility's 102 client facility, such as through a USB port, or in physical proximity with the enterprise facility's 102 client facility such that a wireless facility connection can be established, such as through a Bluetooth connection. These physical proximity threats 110 may be another mobile computing device, a portable memory storage device, a mobile communications device, or the like, such as CDs and DVDs, memory sticks, flash drives, external hard drives, cell phones, PDAs, MP3 players, digital cameras, point-to-point devices, digital picture frames, digital pens, navigation devices, tablets, appliances, and the like. A physical proximity threat 110 may have been previously infiltrated by network threats while connected to an unprotected network connection outside the enterprise facility 102, and when connected to the enterprise facility 102 client facility, pose a threat. Because of their mobile nature, physical proximity threats 110 may infiltrate computing resources in any location, such as being physically brought into the enterprise facility 102 site, connected to an enterprise facility 102 client facility while that client facility is mobile, plugged into an unprotected client facility at a secondary location 108, and the like. A mobile device, once connected to an unprotected computer resource, may become a physical proximity threat 110. In embodiments, the endpoint computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Having provided an overall context for threat detection, the description now turns to a brief discussion of embodiments of the present concept, followed by a description of systems and methods for mitigating outbound electronic message spam.

Figure 2A:
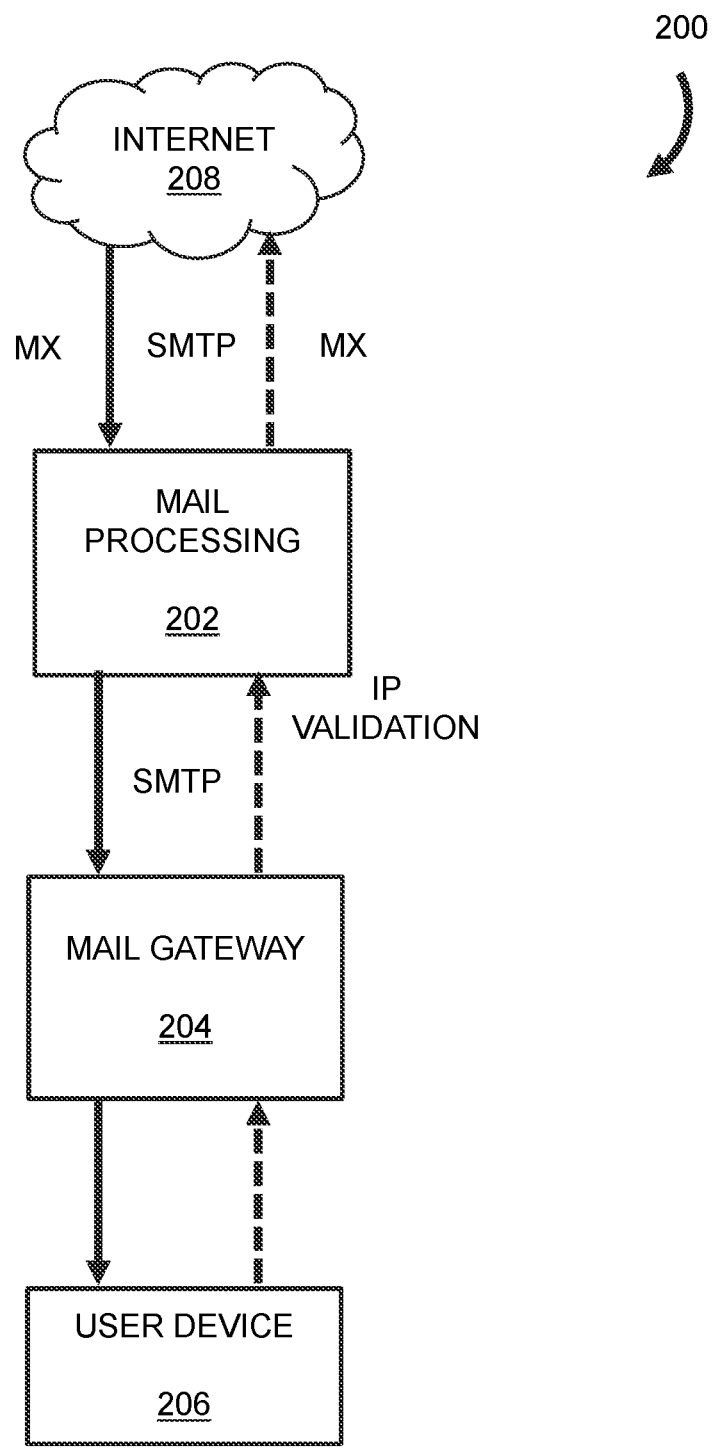
FIG. 2A is a diagram of an email network environment according to an example embodiment.

FIG. 2A is a diagram of an email network environment 200 in which a user can receive emails from and send emails to external email account users. Solid arrows indicate inbound email flow and dashed arrows indicate outbound email flow. The email network environment 200 includes a mail processing service 202, a mail gateway 204 and one or more user devices 206. Referring also to FIG. 1, some of the email network environment 200 may be part of and implemented in the threat management facility 100 and some of the email network 200 may be separate from but in communication with the threat management facility 100. For example, the mail gateway 204 may be located at the enterprise facility 102 and the user devices may be clients 144A-F. The enterprise facility 102 may include other elements of the network environment 200, such as one or more laptops, desktops, servers, gateways, communication ports, handheld or mobile devices, firewalls, and the like. The mail processing service 202 may be implemented at the enterprise facility 102 and/or the threat management facility 100 and may interact with the security management facility 122 and remedial actions facility 128. In an alternative example, the mail processing service 202 may utilize a secure mail gateway that is hosted in the cloud (e.g., hosted via an Amazon Web Services (AWS) cloud computing platform).

A user may receive, via the user device 206, inbound emails from a network (Internet) 208. The emails are first processed by the mail processing service 202 and provided to the user device 206 via the mail gateway 204. The user may send outbound emails via the mail gateway 204 and mail processing service 202 to other email users through the network 208. The user device 206 may execute an email client application or program such as Microsoft Outlook™, Thunderbird, Apple Mail™, or the like. For example, the email client application can be stored in the memory of the user device 206.

In some embodiments, the mail processing service 202 and/or mail gateway 204 perform a reputation check operation on metadata identified in received email messages. During a reputation check operation, the mail processing service 202 and/or mail gateway 204 may communicate with a reputation scoring system, which stores reputation information such as a sender score that identifies the quality of the reputation of the sender of an email. In some embodiments, a reputation scoring system may be part of the network access rules facility 124 of FIG. 1. Data stored may include IP addresses, uniform resource locator (URL)/uniform resource identifier (URI) addresses, and/or other sender identifiers corresponding to an email sender known to be associated with downloading malware or other security threat data. The mail processing service 202 and/or mail gateway 204 may compare a sender identifier such as an IP address of a sender stored by the reputation scoring system with an IP address of a received email and determine from the sender score corresponding to the IP address the reputation of the sender. The result of a reputation check operation may be used to perform a reputation filtering operation to check a URI against a list of URIs of known sources of malware or suspicious IP address known to be associated with downloading security threat software. Alternatively or additionally, the reputation check operation may be performed on an email sent by the user device 206 to a recipient, for example, by determining if any IoCs are associated with the outbound email, as described in more detail below.

In operation, the user device 206 is configured to communicate over the network 208 via the mail gateway 204. The user device 206 can include at least one processor coupled to a computer readable medium having software instructions stored thereon that, when executed by the processor, causes the processor to perform a combination of email and network security operations including a sending of email from the user device 206 to determine a delivery IP address to be used to send the email to an email recipient. In some embodiments, the user device 206, mail processing service 202, and/or the mail gateway 204 may perform network security operations in connection with elements of the threat management facility 100 of FIG. 1. The user device 206, mail processing service 202, and mail gateway 204 (and/or other network device(s)) can each be configured to perform a plurality of security tasks and to communicate over the network 208. Security tasks can include receiving data from the threat management facility 100 and/or an external data source, analyzing the received email messages to identify a threat or a potential threat, and responding to the detected events. In some implementations, the user device 206 can perform one or more security tasks. A network device of the network 208 and/or the gateway computer 204 such as a firewall can be configured to automatically determine any non-redundant security tasks (security tasks not performed by the user device 206).

Figure 2B:
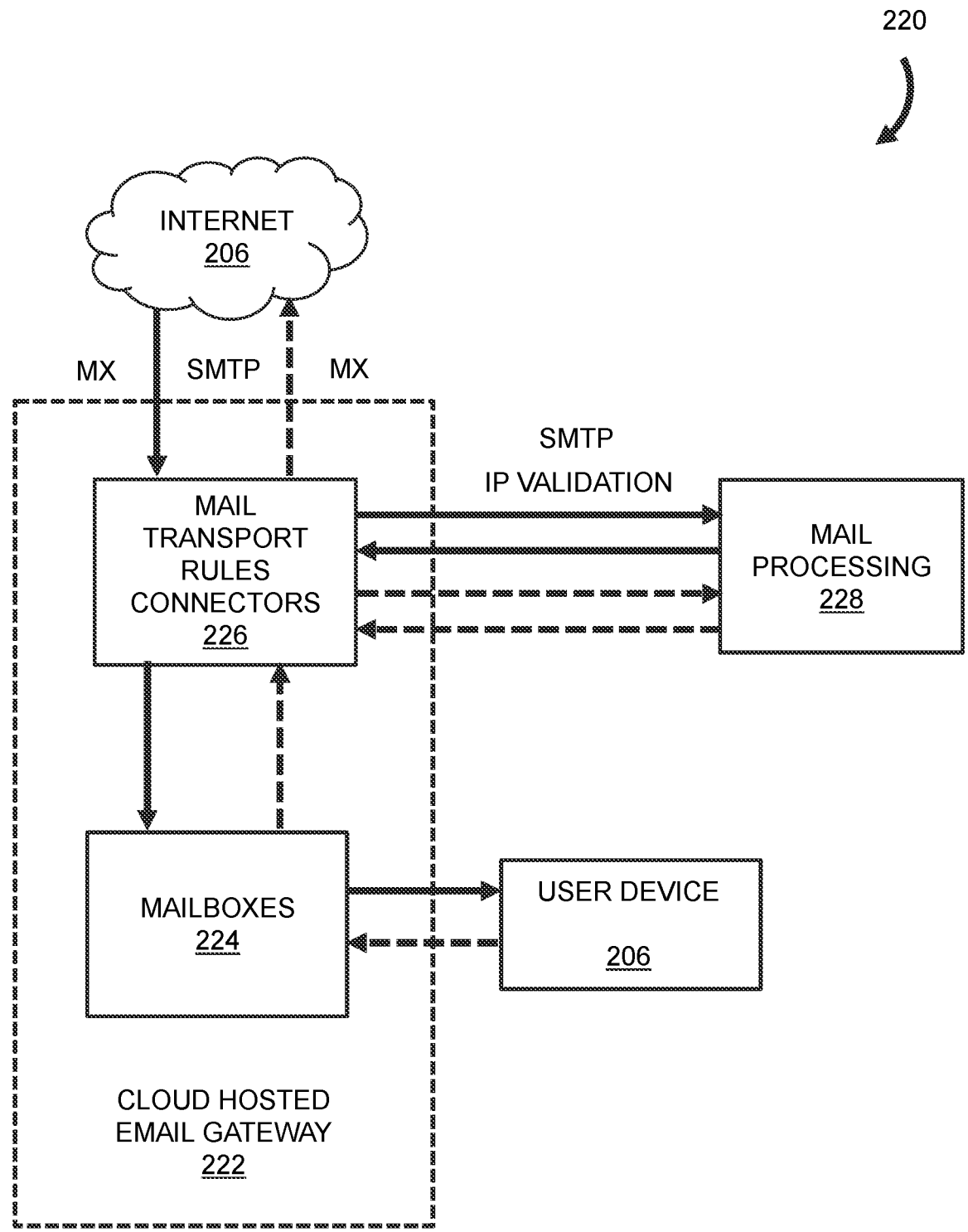
FIG. 2B is a diagram of an email network environment according to another example embodiment.

FIG. 2B is a diagram of an alternative email network environment 220 in which solid arrows indicate inbound email flow and dashed arrows indicate outbound email flow. In this environment 220, a cloud hosted email gateway 222 (e.g., Microsoft Office 365 or Google Gmail) provides mailboxes 224 accessible to users and further includes a transport rules connectors service 226. In contrast to the environment 200 shown in FIG. 2A in which the mail processing service 202 is in-line between the mail processing service 202 and the network 208, a mail processing service 228 in the depicted environment 220 receives emails from and forwards emails to the cloud hosted email gateway 222 via the transport rules connector service 226. Regardless of this distinction, the mail processing service 228 operates on email flows similarly to the mail processing service 202 of FIG. 2A.

Figure 3:
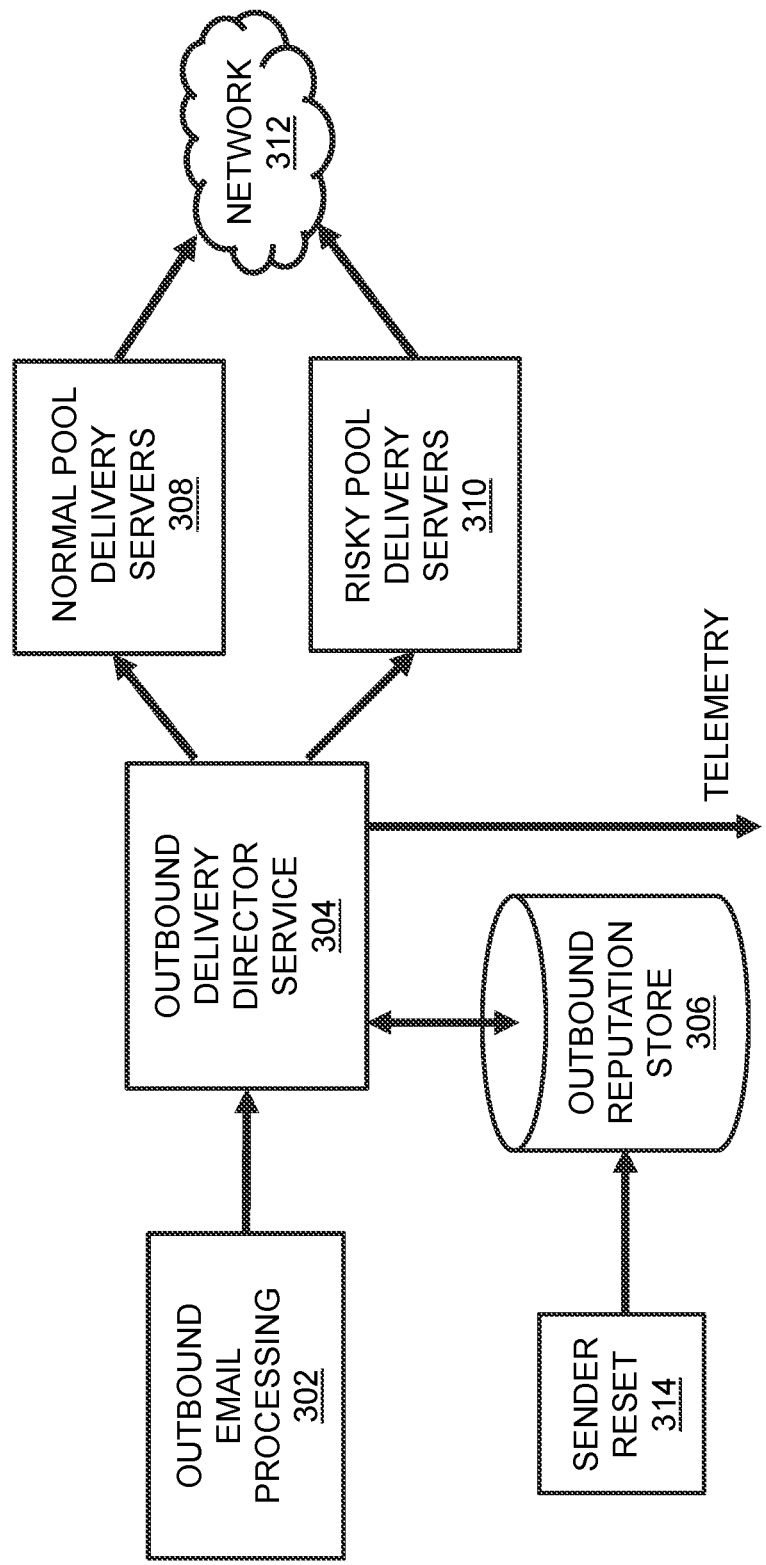
FIG. 3 is a functional block diagram of a computer system having one or more processors and one or more memory devices and configured to perform a plurality of operations for mitigating outbound electronic message spam.

FIG. 3 is a functional block diagram of a computer system having one or more processors and one or more memory devices and configured to perform a plurality of operations for mitigating outbound electronic message spam. The block diagram depicts operations that may be performed to manage outbound emails that may be spam emails.

Initially, an outbound email originating from a user device is processed 302 to see if there are any IoCs associated with the email and, if at least one IoC is detected, an IoC flag is set in the email context. The outbound delivery director service 304 determines if the IoC flag is set in the email context. If the IoC flag is present, a record is written to the outbound reputation store 306 and the email is routed to the network using a delivery server in the risky pool 310.

If the IoC flag is not present in the email context, the outbound delivery director service 304 performs a lookup in the outbound reputation store 306. If a record is found for the sender of the outbound email indicating a poor reputation, the email is delivered using a delivery server in the risky pool 310. Regardless of what triggers the use of an IP address from the risky pool 310, the spammer remains unaware that any outbound spam emails generated by the spammer are being handled in a non-standard manner.

Conversely, if no record is found for the sender, the email is sent from a delivery server in the normal pool 308. Thus, emails having an IoC flag present in the message context and/or having a sender record in the outbound reputation store 306 are utilizing IP addresses that may be at risk of being blocked while other emails are sent from IP addresses associated with the normal pool 308.

In the preceding description, the IoC flag is set in the email context if at least one IoC is detected. In some alternative embodiments, the number of IoCs required for the IoC flag to be set for the email may be greater than one. For example, one IoC may be based on the time of day when an outbound email is sent. A time that is outside of normal working hours for the time zone of the sender may be considered an IoC; however, this is just one factor and, by itself, may not be enough to conclude that the email is an outbound spam email. Similarly, an email address for a recipient that the sender has never previously sent email to may be considered an IoC but may not be enough to conclude that the email is an outbound spam email. Notwithstanding, a greater number of such IoCs can provide more confidence in concluding that the email is an outbound spam email so that the email is sent from an IP address associated with the risky pool 310.

The outbound reputation store 306 may be implemented as a key value store that is optimized for read execution rather than write execution and includes two logical tables. One table is based on the sender and the other table is based on the recipient. The sender table includes entries for each sender seen to have sent an IoC email. The value may include the date and may included other details regarding the IoC such as the subject of the email. The recipient table includes entries for the recipient of an IoC email. For example, this may be the address of a known spammer that may be reused for additional spam emails.

In some embodiments, the user is notified that a possible compromise of their email account occurred. The notification may be accompanied by a request for the user to modify a security feature that enables access to the email account. For example, the user may change a password for the account and/or may enable multi-factor authentication for the account if not previously implemented. Once confirmation of completion of the modification of the security feature, the sender can be removed from the sender table, for example, by a script provided as a tool for email operations. Optionally, a telemetry stream from the outbound delivery director service 304 can be generated to update email operations and trigger the sending of notifications to an email administrator.

Figure 4:
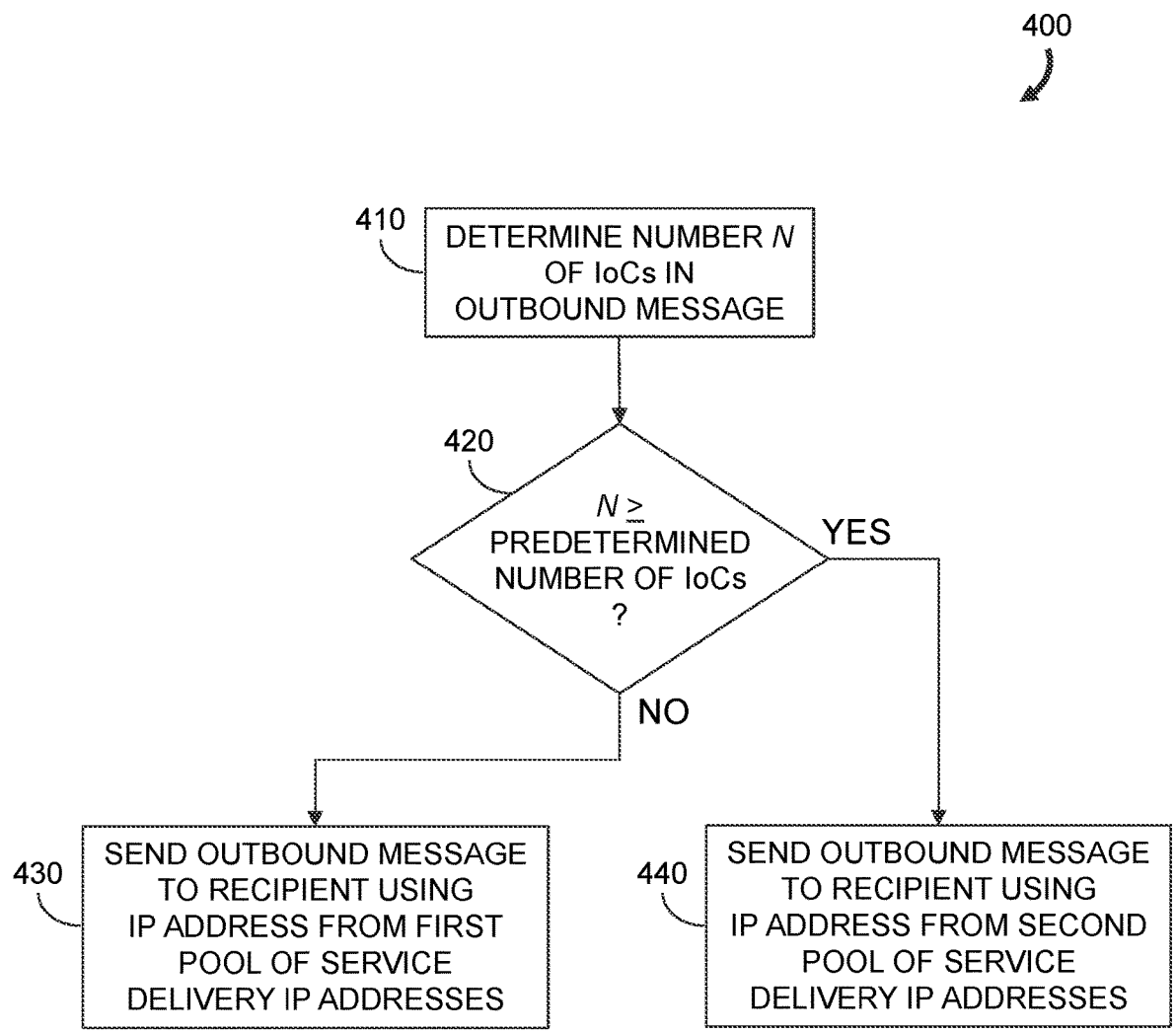
FIG. 4 is a flowchart representation of an example embodiment of a method for mitigating outbound electronic message spam.

FIG. 4 is a flowchart representation of an example embodiment of a method 400 for mitigating outbound electronic message spam such as email spam. For example, this method 400 may be executed by a computer system operating according to the functional block diagram of FIG. 3. According to the method 400, the number N of IoCs for an outbound electronic message to a recipient sent from an electronic messaging account of a sender is determined 410. If it is determined 420 that the number N of IoCs is less than a predetermined number of IoCs, the message is sent 430 by the one or more processors to the recipient using an IP address from a first (normal) pool of service delivery IP addresses. Conversely, if it is determined 420 the number N of IoCs for the message equals or exceeds the predetermined number, the message is sent 440 to the recipient using an IP address from a second (risky) pool of service delivery IP addresses. For example, the predetermined number of IoCs for the determination 420 may be one, i.e., so that a single IoC (N=1) for the outbound message is sufficient to send to outbound message using an IP address from the second pool of service delivery IP addresses.

Figure 5:
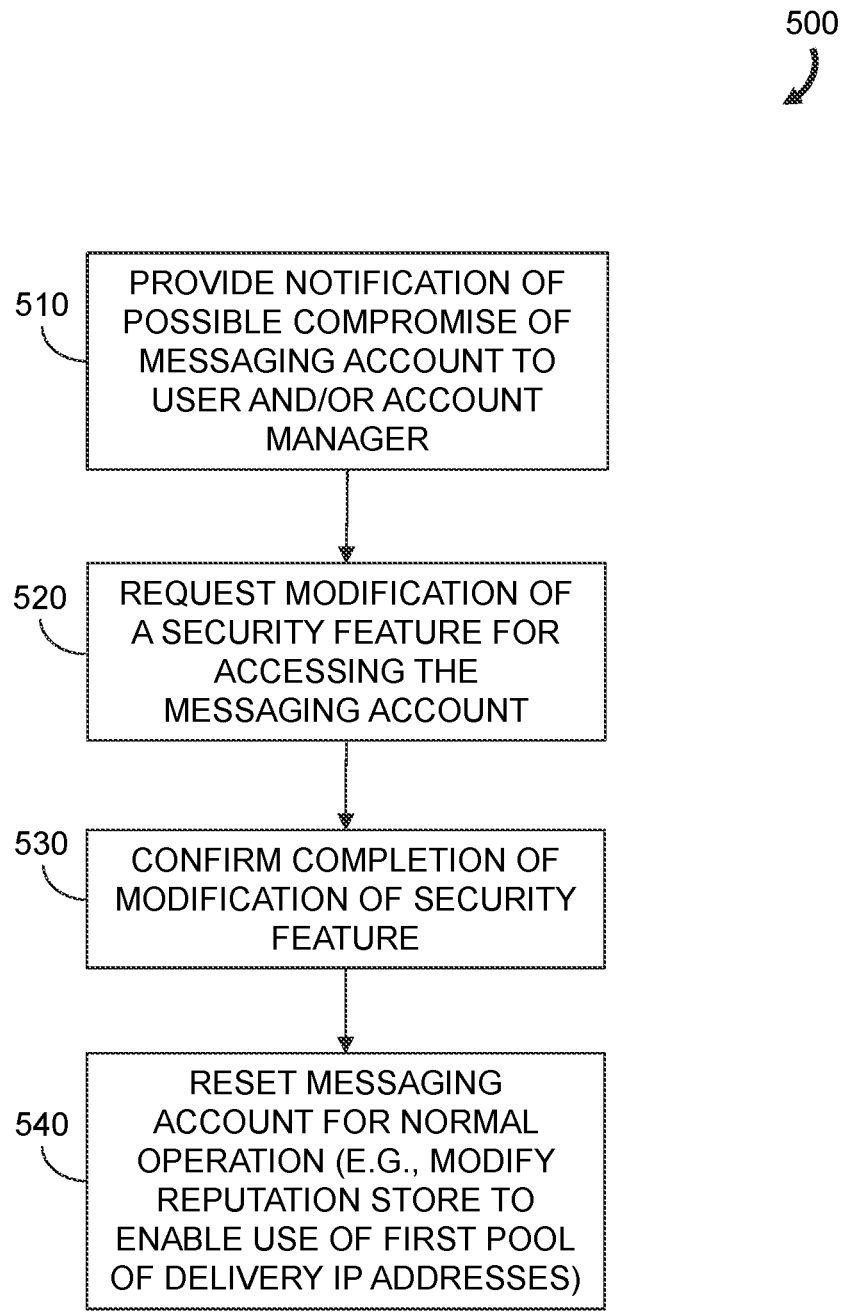
FIG. 5 is a flowchart representation of an example of a sequence of additional operations that may supplement the example embodiment of the method according to FIG. 4.

FIG. 5 is a flowchart representation of an example of a sequence 500 of additional operations that may supplement the method 400 of FIG. 4. More specifically, if the outbound message is sent (440, FIG. 4) using an IP address from the second pool of IP addresses, a notification may be provided 510 to a user of the email account, an administrator of the account or both the user and the administrator. By way of non-limiting examples, the notification can be sent via email, as a text message or as an alert in an administrative operator display. In another option, notification to the email account can be made as a telephone call from support staff. The notification may include an alert of a possible compromise of the email account. A request 520 is made for a security feature that limits access to the account. This request 520 may be part of the original notification 510 or may be sent separately. For example, the requested modification may be a change to a password for the account. Alternatively, or in combination, the request may be for the user or administrator to implement multi-factor authentication or other means to eliminate access to the account by the spammer.

Although the foregoing figures illustrate various embodiments of the disclosed systems and methods, additional and/or alternative embodiments are contemplated as falling within the scope of this disclosure. For example, in one embodiment, this disclosure provides a method for mitigating outbound electronic message spam. The method includes determining, by one or more processors of a computer system, whether an outbound electronic message to a recipient sent from an electronic messaging account of a sender has at least a predetermined number of indicators of compromise. The method further includes sending, by the one or more processors, the outbound electronic message to the recipient using an IP address from a first pool of service delivery IP addresses based on a determination that the outbound electronic message has less than the predetermined number of indicators of compromise, and sending, by the one or more processors, the outbound electronic message to the recipient using an IP address from a second pool of service delivery IP addresses based on a determination that the outbound electronic message has at least the predetermined number of indicators of compromise.

In one embodiment, the method further includes providing, by the one or more processors of the computer system, a notification of a possible compromise of the electronic messaging account, wherein the notification includes a request to modify a security feature that enables access to the electronic messaging account. The notification may be provided as at least one of an email, a text message and an alert in an administrative operator display. The modification of the security feature may include at least one of a change to a password and an implementation of multi-factor authentication.

In another embodiment, the determining whether the outbound electronic message includes at least a predetermined number of indicators of compromise includes determining, by the one or more processors, whether a database containing senders known to have sent one or more spam precursor electronic messages includes the sender of the outbound electronic message. In a further embodiment, the method may further include removing, by the one or more processors, the sender of the outbound electronic message from the database subsequent to a modification of a security feature.

In still another embodiment, the determining whether the outbound electronic message includes at least a predetermined number of indicators of compromise includes determining, by the one or more processors, whether a database containing recipients of one or more spam precursor electronic messages includes the recipient of the outbound electronic message.

In another embodiment, this disclosure provides for a computer system having one or more processors and one or more memory devices. The one or more memory devices contain program code executable by the one or more processors to perform a plurality of operations for mitigating outbound electronic message spam. The plurality of operations includes determining, by one or more processors of a computer system, whether an outbound electronic message to a recipient sent from an electronic messaging account of a sender has at least a predetermined number of indicators of compromise. The plurality of operations further includes sending, by the one or more processors, the outbound electronic message to the recipient using an IP address from a first pool of service delivery IP addresses based on a determination that the outbound electronic message has less than the predetermined number of indicators of compromise, and sending, by the one or more processors, the outbound electronic message to the recipient using an IP address from a second pool of service delivery IP addresses based on a determination that the outbound electronic message has at least the predetermined number of indicators of compromise.

In one embodiment of the computer system, the plurality of operations further includes providing, by the one or more processors, a notification of a possible compromise of the electronic messaging account, wherein the notification includes a request to modify a security feature that enables access to the electronic messaging account. The notification may include at least one of an email, a text message and an alert in an administrative operator display. The modification of the security feature may include at least one of a change to a password and an implementation of multi-factor authentication.

In another embodiment of the computer system, the one or more memory devices includes a database containing senders known to have sent one or more spam precursor electronic messages and the determining, by the one or more processors, whether the outbound electronic message has at least the predetermined number of indicators of compromise includes determining whether the sender of the outbound electronic message is included in the database.

In still another embodiment of the computer system, the one or more memory devices includes a database containing recipients of one or more spam precursor electronic messages and the determining, by the one or more processors, whether the outbound electronic message directed from the sender to the recipient has at least the predetermined number of indicators of compromise includes determining whether the recipient of the outbound electronic message is included in the database.

In another embodiment, this disclosure provides for a computer program product for mitigating outbound electronic message spam. The computer program product includes one or more computer readable storage media having computer readable program code collectively stored on the one or more computer readable storage media, the computer readable program code being executed by one or more processors of a computer system to cause the computer system to perform a plurality of operations. The operations include determining, by the one or more processors of the computer system, whether an outbound electronic message to a recipient sent from an electronic messaging account of a sender has at least a predetermined number of indicators of compromise. The operations further include sending, by the one or more processors, the outbound electronic message to the recipient using an IP address from a first pool of service delivery IP addresses based on a determination that the outbound electronic message has less than the predetermined number of indicators of compromise, and sending, by the one or more processors, the outbound electronic message to the recipient using an IP address from a second pool of service delivery IP addresses based on a determination that the outbound electronic message has at least the predetermined number of indicators of compromise.

In one embodiment of the computer program product, the operations further include providing, by the one or more processors of the computer system, a notification of a possible compromise of the electronic messaging account, wherein the notification includes a request to modify a security feature that enables access to the electronic messaging account. The notification may be provided as at least one of an email, a text message and an alert in an administrative operator display. The modification of the security feature may include at least one of a change to a password and an implementation of multi-factor authentication.

In another embodiment of the computer program product, the determining whether the outbound electronic message has at least the predetermined number of indicators of compromise includes determining, by the one or more processors, whether a database containing senders known to have sent one or more spam precursor electronic messages includes the sender of the outbound electronic message. The plurality of operations may further include removing, by the one or more processors, the sender of the outbound electronic message from the database subsequent to a modification of a security feature.

In still another embodiment of the computer program product, the determining whether the outbound electronic message has at least the predetermined number of indicators of compromise includes determining, by the one or more processors, whether a database containing recipients of one or more spam precursor electronic messages includes the recipient of the outbound electronic message.

It will be appreciated that the modules, processes, systems, and sections described above may be implemented in hardware, hardware programmed by software, software instructions stored on a nontransitory computer readable medium or a combination of the above. A system as described above, for example, may include a processor configured to execute a sequence of programmed instructions stored on a nontransitory computer readable medium. For example, the processor may include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions may be compiled from source code instructions provided in accordance with a programming language such as Java, C, C++, C#.net, assembly or the like. The instructions may also comprise code and data objects provided in accordance with, for example, the Visual Basic™ language, or another structured or object-oriented programming language. The sequence of programmed instructions, or programmable logic device configuration software, and data associated therewith may be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections may be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above may be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein may be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that may be used on a variety of computer platforms. Alternatively, embodiments of the disclosed method, system, and computer program product may be implemented partially or fully in hardware using, for example, standard logic circuits or a VLSI design. Other hardware or software may be used to implement embodiments depending on the speed and/or efficiency requirements of the systems, the particular function, and/or particular software or hardware system, microprocessor, or microcomputer being utilized. Embodiments of the method, system, and computer program product may be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) may be implemented in software executed on a programmed general-purpose computer, a special purpose computer, a microprocessor, a network server or switch, or the like.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter. It should also be understood that references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

The invention claimed is:

1. A method for mitigating outbound electronic message spam, comprising:
   determining, by one or more processors of a computer system, whether an outbound electronic message to a recipient sent from an electronic messaging account of a sender has at least a predetermined number of indicators of compromise, wherein determining whether the outbound electronic message includes at least the predetermined number of indicators of compromise includes:
      determining, by the one or more processors, whether a database containing senders known to have sent one or more spam precursor electronic messages includes the sender of the outbound electronic message; and/or
      determining, by the one or more processors, whether a database containing recipients of the one or more spam precursor electronic messages includes the recipient of the outbound electronic message;
   sending, by the one or more processors, the outbound electronic message to the recipient using an Internet Protocol (IP) address from a first pool of service delivery IP addresses in response to a determination that the outbound electronic message has less than the predetermined number of indicators of compromise; and
   sending, by the one or more processors, the outbound electronic message to the recipient using an IP address from a second pool of service delivery IP addresses in response to a determination that the outbound electronic message has at least the predetermined number of indicators of compromise.

2. The method of claim 1, further comprising providing, by the one or more processors of the computer system, a notification of a possible compromise of the electronic messaging account, wherein the notification comprises a request to modify a security feature that enables access to the electronic messaging account.

3. The method of claim 2, wherein the notification is provided as at least one of an email, a text message and an alert in an administrative operator display.

4. The method of claim 2, wherein the modification of the security feature includes at least one of a change to a password and an implementation of multi-factor authentication.

5. The method of claim 1, further comprising removing, by the one or more processors, the sender of the outbound electronic message from the database subsequent to a modification of a security feature.

6. A computer system, comprising:
one or more processors; and
one or more memory devices containing program code executable by the one or more processors to perform a plurality of operations for mitigating outbound electronic message spam, the plurality of operations comprising:
  determining whether an outbound electronic message to a recipient sent from an electronic messaging account of a sender has at least a predetermined number of indicators of compromise, wherein determining whether the outbound electronic message includes at least the predetermined number of indicators of compromise includes:
    determining whether a database containing senders known to have sent one or more spam precursor electronic messages includes the sender of the outbound electronic message; and/or
    determining whether a database containing recipients of the one or more spam precursor electronic messages includes the recipient of the outbound electronic message;
  sending the outbound electronic message to the recipient using an Internet Protocol (IP) address from a first pool of service delivery IP addresses in response to a determination that the outbound electronic message has less than the predetermined number of indicators of compromise; and
  sending the outbound electronic message to the recipient using an IP address from a second pool of service delivery IP addresses in response to a determination that the outbound electronic message has at least the predetermined number of indicators of compromise.

7. The computer system of claim 6, wherein the plurality of operations further comprises providing, by the one or more processors, a notification of a possible compromise of the electronic messaging account, wherein the notification comprises a request to modify a security feature that enables access to the electronic messaging account.

8. The computer system of claim 7, wherein the notification includes at least one of an email, a text message and an alert in an administrative operator display.

9. The computer system of claim 7, wherein the modification of the security feature includes at least one of a change to a password and an implementation of multi-factor authentication.

10. A computer program product for mitigating outbound electronic message spam, the computer program product comprising:
one or more non-transitory computer readable storage media having computer readable program code collectively stored on the one or more computer readable storage media, the computer readable program code being executed by one or more processors of a computer system to cause the computer system to perform a plurality of operations comprising:
  determining, by the one or more processors of the computer system, whether an outbound electronic message to a recipient sent from an electronic messaging account of a sender has at least a predetermined number of indicators of compromise, wherein determining whether the outbound electronic message includes at least the predetermined number of indicators of compromise includes:
    determining, by the one or more processors, whether a database containing senders known to have sent one or more spam precursor electronic messages includes the sender of the outbound electronic message; and/or
    determining, by the one or more processors, whether a database containing recipients of the one or more spam precursor electronic messages includes the recipient of the outbound electronic message;
  sending, by the one or more processors, the outbound electronic message to the recipient using an Internet Protocol (IP) address from a first pool of service delivery IP addresses in response to a determination that the outbound electronic message has less than the predetermined number of indicators of compromise; and
  sending, by the one or more processors, the outbound electronic message to the recipient using an IP address from a second pool of service delivery IP addresses in response to a determination that the outbound electronic message has at least the predetermined number of indicators of compromise.

11. The computer program product of claim 10, wherein the plurality of operations further comprises providing, by the one or more processors of the computer system, a notification of a possible compromise of the electronic messaging account, wherein the notification comprises a request to modify a security feature that enables access to the electronic messaging account.

12. The computer program product of claim 11, wherein the notification is provided as at least one of an email, a text message and an alert in an administrative operator display.

13. The computer program product of claim 11, wherein the modification of the security feature includes at least one of a change to a password and an implementation of multi-factor authentication.

14. The computer program product of claim 10, wherein the plurality of operations further comprises removing, by the one or more processors, the sender of the outbound electronic message from the database subsequent to a modification of a security feature.

* * * * *